(12) United States Patent
Sugiura (10) Patent No.: US 12,030,344 B2
(45) Date of Patent: Jul. 9, 2024

(54) TIRE

(71) Applicant: SUMITOMO RUBBER INDUSTRIES, LTD., Hyogo (JP)

(72) Inventor: Takashi Sugiura, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 17/366,261

(22) Filed: Jul. 2, 2021

(65) Prior Publication Data

US 2022/0001697 A1 Jan. 6, 2022

(30) Foreign Application Priority Data

Jul. 3, 2020 (JP) .................................. 2020-115856

(51) Int. Cl.
*B60C 11/00* (2006.01)
*B60C 11/01* (2006.01)
*B60C 11/12* (2006.01)
*B60C 11/13* (2006.01)

(52) U.S. Cl.
CPC .......... *B60C 11/0083* (2013.01); *B60C 11/01* (2013.01); *B60C 11/1236* (2013.01); *B60C 11/1281* (2013.01); *B60C 11/1323* (2013.01); *B60C 11/1353* (2013.01); *B60C 2200/06* (2013.01)

(58) Field of Classification Search
CPC . B60C 11/0083; B60C 11/01; B60C 11/0302; B60C 11/1236; B60C 11/1281; B60C 11/1323; B60C 11/1353; B60C 2200/06; B60C 2011/013
See application file for complete search history.

(56) References Cited

U.S. PATENT DOCUMENTS

| 2005/0061410 A1* | 3/2005 | Meyer ..................... B60C 11/01 |
| | | 152/209.14 |
| 2012/0199258 A1* | 8/2012 | Clayton ................ B60C 11/042 |
| | | 152/209.18 |
| 2019/0337336 A1* | 11/2019 | Takata ................ B60C 25/0533 |
| 2020/0001652 A1* | 1/2020 | Ohta ....................... B60C 13/02 |

FOREIGN PATENT DOCUMENTS

| JP | 2011225084 A | * 11/2011 | ............. B60C 11/03 |
| JP | 2018-127199 A | 8/2018 | |

* cited by examiner

*Primary Examiner* — Justin R Fischer
*Assistant Examiner* — Philip N Schwartz
(74) *Attorney, Agent, or Firm* — Greenblum & Bernstein, P.L.C.

(57) ABSTRACT

A tire has a tread portion divided into a crown land region, shoulder land regions, and middle land regions. The crown land region comprises a crown axial central portion. The middle land region comprises a middle axial inner portion and a middle axial outer portion. The shoulder land region comprises a shoulder axial inner portion and a shoulder axial central portion. The radius Rmi of curvature of the middle axial inner portion is 0.80 to 1.20 times the radius Rcc of curvature of the crown axial central portion. The radius Rsc of curvature of shoulder axial central portion is 0.80 to 1.20 times the radius Rmo of curvature of middle axial outer portion. The radii Rsc and Rmo are less than the radii Rcc and Rmi. The radius Rsi of the shoulder axial inner portion is less than the radii Rsc and Rmo.

19 Claims, 4 Drawing Sheets

TIRE

TECHNICAL FIELD

The present invention relates to a tire, more specifically to a tread profile capable of improving uneven wear of the tread portion.

BACKGROUND ART

Patent Document 1 below discloses a heavy-duty tire in which the tread portion is improved in the resistance to its center wear by specifically defining the tread profile, namely, the contour of the ground contacting top surface of the tread portion in the meridian cross-section of the tire.

Specifically, in the heavy-duty tire of Patent Document 1, the tread profile is made up of an inner arc portion having a radius R1 curvature whose center is positioned on the tire equatorial plane, and an outer arc portion positioned on each side of the inner arc portion and connected thereto through an inflection point P, and the outer arc portion has a radius R2 of curvature which is smaller than the radius R1 of curvature. The inflection point P is located in a middle land region of the tread portion, and the distance from the tire equator to the inflection point P is specifically defined. Thereby, the tread profile becomes relatively flat in the vicinity of the tire equator, and the resistance to the center wear is improved.

Patent Document 1: Japanese Patent Application Publication No. 2018-127199

SUMMARY OF THE INVENTION

Problems to be Solved by the Invention

In the above-mentioned tires, however, the resistance to uneven wear in shoulder land regions of the tread portion is not sufficient, therefore, there is room for improvement.

The present invention was made in view of the above circumstances, and a primary object of the present invention is to provide a tire improved in the resistance to uneven wear in the shoulder land regions.

According to the present invention, a tire comprises:
a tread portion provided with a plurality of circumferential grooves extending continuously in the tire circumferential direction, and a plurality of land regions divided by the plurality of circumferential grooves,
the plurality of land regions including
a crown land region on the tire equator,
shoulder land regions extending axially inwardly from respective tread edges, and
middle land regions between the respective shoulder land regions and the crown land region,
the ground contacting top surface of the crown land region comprising a crown axial central portion defined as including a center position in the tire axial direction of the crown land region,
the ground contacting top surface of each of the middle land regions comprising
a middle axial inner portion defined as extending from an axially inner edge of the ground contacting top surface, and
a middle axial outer portion defined as extending from an axially outer edge of the ground contacting top surface, and
the ground contacting top surface of each of the shoulder land regions comprising
a shoulder axial inner portion defined as extending from an axially inner edge of the ground contacting top surface, and
a shoulder axial central portion defined as including a center position in the tire axial direction of the shoulder land region, wherein
in the meridian cross-section of the tire including the rotational axis of the tire,
a radius Rmi of curvature of the middle axial inner portion is substantially equal to a radius Rcc of curvature of the crown axial central portion,
a radius Rsc of curvature of the shoulder axial central portion is substantially equal to a radius Rmo of curvature of the middle axial outer portion,
the radius Rsc of curvature of the shoulder axial central portion and the radius Rmo of curvature of the middle axial outer portion are smaller than
the radius Rcc of curvature of the crown axial central portion and the radius Rmi of curvature of the middle axial inner portion, and
a radius Rsi of curvature of the shoulder axial inner portion is smaller than
the radius Rsc of curvature of the shoulder axial central portion and the radius Rmo of curvature of the middle axial outer portion.

The tire is a heavy-duty pneumatic tire, and it is preferable that the radius Rcc of curvature of the crown axial central portion is 1600 to 2000 mm, and the radius Rmi of curvature of the middle axial inner portion is 1600 to 2000 mm.

The tire is a heavy-duty pneumatic tire, and it is preferable that the radius Rsc of curvature of the shoulder axial central portion is 400 to 500 mm, and
the radius Rmo of curvature of the middle axial outer portion is 400 to 500 mm.

The tire is a heavy-duty pneumatic tire, and it is preferable that the radius Rsi of curvature of the shoulder axial inner portion is 80 to 160 mm.

The circumferential grooves include a shoulder circumferential groove disposed on each side of the tire equator to separate between the shoulder land region and the middle land region, and
it is preferable that, in the meridian cross-section of the tire, a virtual line, which extends in parallel with a tread profile and an extension of the tread profile, passing through the bottom of the shoulder circumferential groove, intersects with a side surface of the tire at a position P1 thereon which is separated from the tire equatorial plane by a distance L1 in the tire axial direction, and the distance L1 is not more than the sum of a maximum depth d1 of the shoulder circumferential groove and a distance L2 in the tire axial direction between the tire equatorial plane and the tread edge.

It is preferable that the distance L1 is 0.80 to 1.00 times the sum of the distance L2 and the maximum depth d1.

It is preferable that the area of the ground contacting top surfaces of the shoulder land regions is larger than the area of the ground contacting top surfaces of the middle land regions.

It is preferable that the area of the ground contacting top surfaces of the shoulder land regions is in a range from 105% to 115% of the area of the ground contacting top surfaces of the middle land regions.

It is preferable that the shoulder land regions are provided with shoulder sipes each connected to one of the circumferential grooves.

It is preferable that the shoulder sipes each have a first sipe wall comprising a main portion, and an inclined portion extending between the main portion and the ground contacting top surface of the shoulder land region, and the inclined portion is inclined at an angle with respect to the tire radial direction which is larger than that of the main portion.

The tire has an intended rotational direction, and it is preferable that the shoulder sipes each have two opposite sipe walls, only one of which to be located on the heel side in the tire rotation direction, is formed as the above-said first sipe wall.

It is preferable that the angle of the inclined portion with respect to the tire radial direction is in a range from 60 to 75 degrees.

The circumferential grooves include a shoulder circumferential groove disposed on each side of the tire equator to separate between the shoulder land region and the middle land region, and the shoulder circumferential groove has a groove bottom comprising an axially inner portion axially inside the groove center line of the shoulder circumferential groove, and an axially outer portion axially outside the groove center line of the shoulder circumferential groove, and it is preferable that, in the meridian cross-section of the tire, the groove bottom is curved so that a radius of curvature of the axially inner portion is larger than a radius of curvature of the axially outer portion.

It is preferable that the radius of curvature of the axially inner portion of the shoulder circumferential groove is not more than 2.0 times the radius of curvature of the axially outer portion of the shoulder circumferential groove.

It is preferable that the shoulder land region has a side surface on the tread edge side which is curved concavely toward the inside in the tire axial direction.

DESCRIPTION OF THE PREFERRED EMBODIMENTS

The present invention can be applied to pneumatic tires and non-pneumatic tires so called airless tires for various vehicles, e.g. heavy-duty vehicles such as trucks and buses, passenger cars and the like.

Hereinafter, taking a pneumatic tire for heavy-duty vehicles as an example, embodiments of the present invention will be described in conjunction with accompanying drawings.

Figure 1:
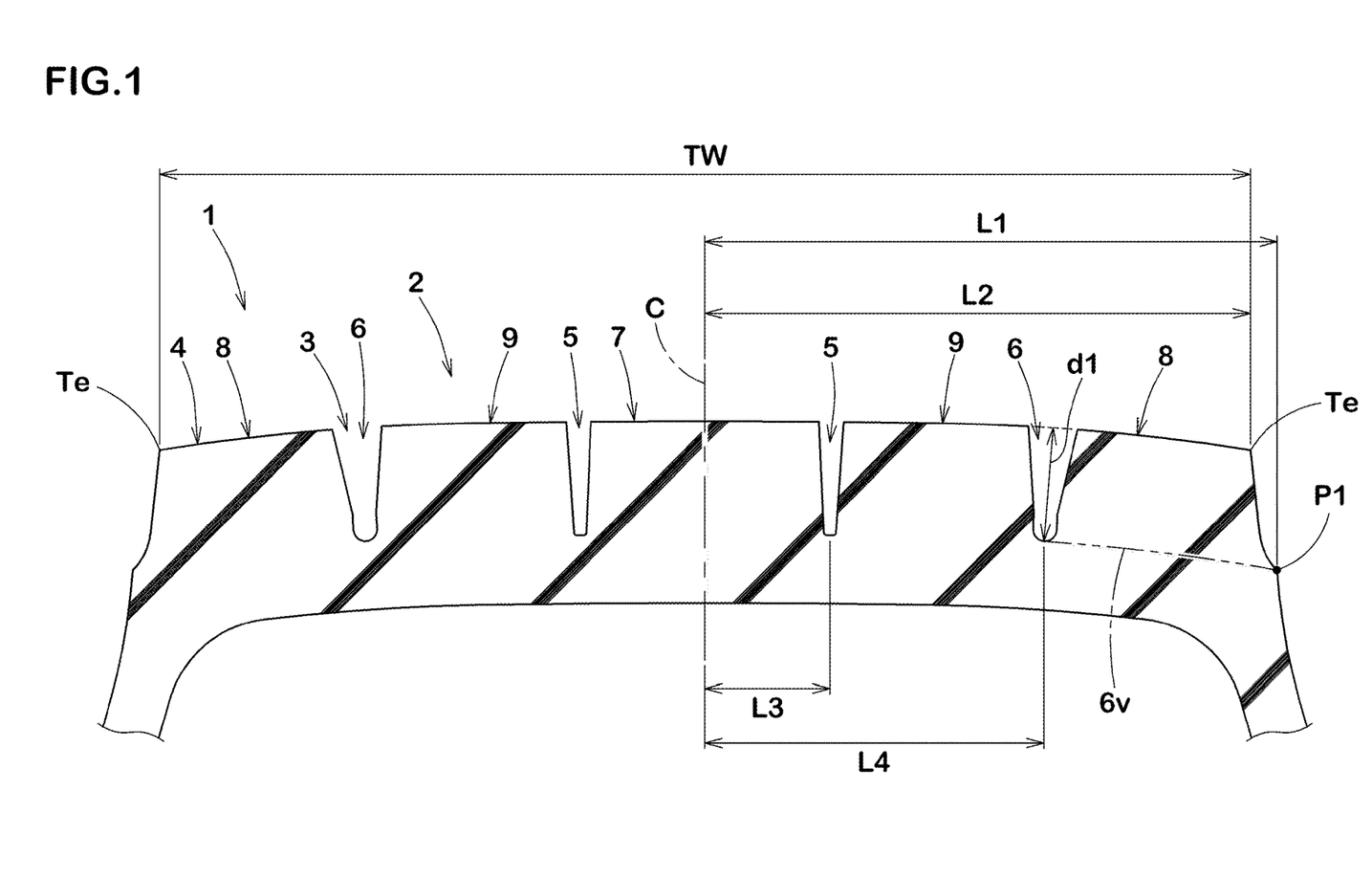
FIG. 1 is a schematic cross-sectional view of a tread portion of a tire as an embodiment of the present invention.

FIG. 1 schematically shows a cross-sectional view of the tread portion 2 of a pneumatic tire 1 for heavy-duty vehicles as an embodiment of the present invention, taken along a tire meridian cross-section including the rotational axis of the tire in its standard state.

Here, the "standard state" of a tire is as follows.

In the case of a pneumatic tire, the "standard state" is such that the tire is mounted on a standard rim, and inflated to 90% of a standard pressure, but loaded with no tire load.

In the case of a non-pneumatic tire, the "standard state" is such that the tire is ready to attach to a vehicle axis but not attached, and also loaded with no tire load. Namely, if the non-pneumatic tire needs to be mounted on a wheel rim or any equivalent device, the "standard state" is such that the tire is mounted on such a wheel rim or equivalent device, but loaded with no tire load.

The above-mentioned standard rim, in particular that for a pneumatic tire, is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and a standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

If there is no applicable standards for the pneumatic tire, or not yet established, the standard rim, standard pressure and standard tire load mean a design rim, maximum pressure and maximum tire load specified for the tire by the tire manufacturer or the like.

In the case of a pneumatic tire, if there are two or more applicable wheel rims having different rim widths, then the wheel rim having the smallest rim width is used as the standard rim.

In the case of a non-pneumatic tire for which applicable standards have not yet established, the standard tire load means a maximum tire load specified by the tire manufacturer or the like. If the non-pneumatic tire needs to be mounted on a wheel rim or any equivalent device, the standard rim means a design rim or equivalent specified by the tire manufacturer or the like.

In this application including specification and claims, various profiles, dimensions, positions and the like of the tire refer to those under the standard state of the tire unless otherwise noted.

The profile of each portion is defined in the tire meridian cross-section including the rotational axis of the tire under the standard state.

The tread edges Te are the axial outermost edges of the ground contacting patch of the tire which occurs when the tire in the standard state is put on a flat horizontal surface at a camber angle of zero and loaded with the standard tire load.

The tread width TW is the width measured under the standard state, as the axial distance between the tread edges Te determined as above.

The tread portion 2 is provided, between the tread edge Tes, with a plurality of circumferential grooves 3 continuously extending in the tire circumferential direction so that the tread portion 2 is axially divided into a plurality of land regions 4 as shown in FIG. 1.

In the present embodiment, the circumferential grooves 3 are an axially inner crown circumferential groove 5 and an axially outer shoulder circumferential groove 6 which are disposed on each side of the tire equator C.

In the present embodiment, each of the crown circumferential groove 5 and the shoulder circumferential groove 6 is a straight groove extending parallel with the tire circumferential direction.

In the present embodiment, the crown circumferential grooves 5 and the shoulder circumferential grooves 6 on both sides of the tire equator are arranged line-symmetrically with respect to the tire equator C.

However, the present invention is not limited to such groove arrangement and groove configurations.

The distance L3 in the tire axial direction from the tire equator C to each of the crown circumferential grooves 5 is, for example, set in a range from 5% to 15% of the tread width TW.

The distance L4 in the tire axial direction from the tire equator C to each of the shoulder circumferential grooves 6 is, for example, set in a range from 25% to 40% of the tread width TW.

It is preferable that the circumferential grooves 3 each have a groove width of at least 3 mm.

The groove widths of the crown circumferential grooves 5 are, for example, set in a range from 1.0 to 3.0%, preferably 1.5% to 2.5% of the tread width TW.

The groove widths of the shoulder circumferential grooves 6 are preferably larger than the groove widths of the crown circumferential grooves 5.

The groove widths of the shoulder circumferential grooves 6 are, for example, set in a range from 3.0% to 5.0%, preferably 3.5% to 4.5% of the tread width TW.

The depths of the crown circumferential grooves 5 and the depths of the shoulder circumferential grooves 6 are, for example, set in a range from 15 to 35 mm, preferably 20 to 30 mm.

The plurality of land regions 4 are: a crown land region 7 defined between the two crown circumferential grooves 5 and positioned on the tire equator C; two shoulder land regions 8 each defined between one of the shoulder circumferential grooves 6 and the adjacent tread edge Te; and two middle land regions 9 each defined between one of the crown circumferential grooves 5 and the adjacent one of the shoulder circumferential grooves 6.

Figure 2:
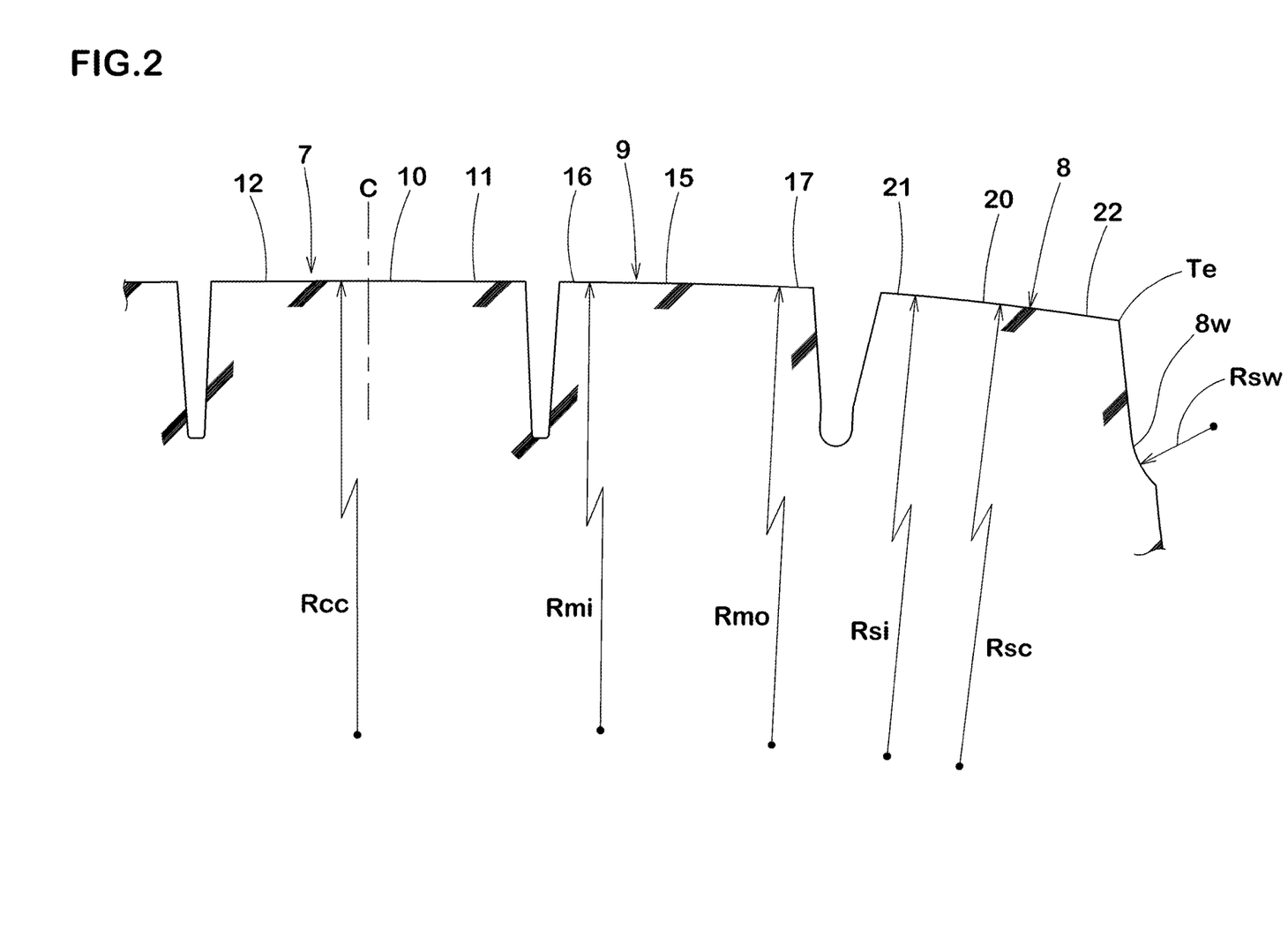
FIG. 2 is a schematic cross-sectional view showing a tread profile of the tread portion.

FIG. 2 shows the profiles of the ground contacting top surfaces of the crown land region 7, the middle land region 9, and the shoulder land region 8.

The ground contacting top surface of the crown land region 7 comprises: a crown axial central portion 10 including a center position in the tire axial direction, of the crown land region 7; a first crown axial outer portion 11 on one side of the portion 10; and a second crown axial outer portion 12 on the other side of the portion 10.

The ground contacting top surface of the middle land region 9 comprises: a middle axial inner portion 16 including an axially inner edge of the top surface; a middle axial outer portion 17 including an axially outer edge of the top surface; and a middle axial central portion 15 therebetween.

The ground contacting top surface of the shoulder land region 8 comprise: a shoulder axial inner portion 21 including an axially inner edge of the top surface; a shoulder axial outer portion 22 including an axially outer edge of the top surface; and a shoulder axial central portion 20 therebetween including a center position in the tire axial direction, of the shoulder land region 8.

In the meridian cross-section of the tire 1 under the standard state, the radius Rmi of curvature of the middle axial inner portion 16 is substantially equal to the radius Rcc of curvature of the crown axial central portion 10, and the radius Rsc of curvature of the shoulder axial central portion 20 is substantially equal to the radius Rmo of curvature of the middle axial outer portion 17.

In this application, an expression "two radii of curvature are substantially equal to each other" and similar expression mean that the ratio of one of the radii to the other of the radii, and vice versa, is in a range from 0.80 to 1.20. This range may be preferably 0.90 to 1.10, more preferably 0.95 to 1.05.

The radius Rsc of curvature of the shoulder axial central portion 20 and the radius Rmo of curvature of the middle axial outer portion 17 are smaller than the radius Rcc of curvature of the crown axial central portion 10 and the radius Rmi of curvature of the middle axial inner portion.

The radius Rsi of curvature of the shoulder axial inner portion 21 is smaller than the radius Rsc of curvature of the shoulder axial central portion 20 and the radius Rmo of curvature of the middle axial outer portion 17.

By configuring the curvatures as above, uneven wear of the shoulder land regions 8 can be effectively suppressed. The reason is presumed as follow.

As described above, the radius Rmi is substantially equal to the radius Rcc, and the radius Rsc is substantially equal to the radius Rmo. As a result, a concentration of the ground contact pressure on a specific position of the tread surface of the tread portion 2 can be prevented, and the resistance to uneven wear is improved.

In general, the ground contacting pressure tends to become higher in the vicinity of the tire equator C than in the vicinity of each tread edge Te. Based on such a tendency, the radii Rsc and Rmo are set to be smaller than the radii Rcc and Rmi. As a result, the ground contacting pressure concentration on any of the portions 10, 16, 17 and 20 can be suppressed.

Even though the tire is provided with the above-mentioned radii configured as above, it is difficult to completely prevent the ground contacting pressure from concentrating on the shoulder axial inner portions 21. This was found as a result of studies made by the inventor of the present invention, and it was also found that, by setting the radius Rsi as being smaller than the radii Rsc and radius Rmo, the ground contacting pressure concentration on the shoulder axial inner portions 21 can be suppressed, and as a result, it is possible to effectively prevent uneven wear occurring in the shoulder land regions 8.

Hereinafter, preferable more detailed features of the present embodiment will be described. Such features can be adopted alone or in any combination in order to enjoy the benefits described.

The crown axial central portion 10, the first crown axial outer portion 11 and the second crown outer portion 12 are formed by a single radius arc. As a result, uneven wear of the crown land region 7 is suppressed. Further, such crown land region 7 exhibits excellent ground contacting property during running straight, which is useful for improving steering stability.

The radius Rcc of curvature of the crown axial central portion 10 is set to be not less than 1600 mm, preferably not less than 1700 mm, more preferably not less than 1750 mm, but not more than 2000 mm, preferably not more than 1900 mm, more preferably not more than 1850 mm.

Also the radius of curvature of the first crown axial outer portion 11 and the radius of curvature of the second crown axial outer portion 12 are preferably set in this way.

However, the radius Rcc of curvature of the crown axial central portion 10 may be different from the radius of curvature of the first crown axial outer portion 11 and the radius of curvature of the second crown axial outer portion 12.

In this case, it is preferable that the radius Rcc of curvature of the crown axial central portion 10 is larger than the radius of curvature of the first crown axial outer portion 11 and the radius of curvature of the second crown axial outer portion 12.

The width in the tire axial direction of the crown axial central portion 10 is in a range from 25% to 50%, preferably 30% to 40% of the width in the tire axial direction of the ground contacting top surface of the crown land region 7.

As a result, uneven wear in edge portions of the crown land region 7 can be suppressed.

The radius Rmi of curvature of the middle axial inner portion 16 is set in a range from 0.85 to 1.15 times, preferably 0.90 to 1.10 times, more preferably 0.95 to 1.05 times the radius Rcc of curvature of the crown axial central portion 10. In the present embodiment, the radius Rmi is equal to the radius RCC.

Specifically, the radius Rmi of curvature of the middle axial inner portion 16 is set to be not less than 1600 mm, preferably not less than 1700 mm, more preferably not less than 1750 mm, but not more than 2000 mm, preferably not more than 1900 mm, more preferably not more than 1850 mm.

It is preferable that the entire middle axial inner portion 16 and a successive part of the middle axial central portion 15 are formed by a single radius arc.

More preferably, the entire ground contacting top surface of the crown land region 7, the entire middle axial inner portion 16, and a successive part of the middle axial central portion 15 are formed by a single radius arc. Thereby, the resistance to uneven wear and steering stability are further improved.

The arc having the radius Rmi of the middle axial inner portion 16 and the arc having the radius Rmo of the middle axial outer portion 17 are smoothly connected with each other without an inflection point within the middle axial central portion 15.

The width in the tire axial direction of the middle axial central portion 15 is in a range from 25% to 50%, preferably 30% to 40% of the width in the tire axial direction of the ground contacting top surface of the middle land region 9.

As described above, the radius Rmo is smaller than the radius Rcc and the radius Rmi.

Further, in the present embodiment, both the following relationships (1) and (2) are satisfied;

$$Rcc/Rmo > Rcc/Rmi \tag{1}$$

$$Rcc/Rmo > Rmi/Rcc \tag{2}$$

As described above, the radius Rsc is smaller than the radius Rcc and the radius Rmi.

Further, in the present embodiment, both the following relationships (3) and (4) are satisfied;

$$Rcc/Rsc > Rcc/Rmi \tag{3}$$

$$Rcc/Rsc > Rmi/Rcc \tag{4}$$

Preferably, the radius Rmo of curvature of the middle axial outer portion 17 is set to be not less than 350 mm, more preferably not less than 400 mm, still more preferably not less than 425 mm, but not more than 550 mm, more preferably not more than 500 mm, still more preferably not more than 475 mm. Preferably, the radius Rmo of curvature of the middle axial outer portion 17 is set in a range from 20% to 30% of the radius Rcc of curvature of the crown axial central portion 10 and/or in a range from 20% to 30% of the radius Rmi of curvature of the middle axial inner portion 16.

As a result, in cooperation with the crown land region 7 configured as described above, the resistance to uneven wear of the middle land region 9 is improved.

The radius Rsc of curvature of the shoulder axial central portion 20 is set in a range from 0.90 to 1.10 times the radius Rmo of curvature of the middle axial outer portion 17. In the present embodiment, the radius Rsc is equal to the radius Rmo.

Preferably, the radius Rsc of curvature of the shoulder axial central portion 20 is set to be not less than 350 mm, more preferably not less than 400 mm, still more preferably not less than 425 mm, but not more than 550 mm, more preferably not more than 500 mm, still more preferably not more than 475 mm. Preferably, the radius Rsc of curvature of the shoulder axial central portion 20 is set in a range from 20% to 30% of the radius Rcc of curvature of the crown axial central portion 10 and/or in a range from 20% to 30% of the radius Rmi of curvature of the middle axial inner portion 16.

It is preferable that the entire middle axial outer portion 17, the entire shoulder axial central portion 20 and the entire shoulder axial outer portion 22 are formed by a single radius arc.

As a result, the resistance to uneven wear is improved. Further, such middle land regions 9 and shoulder land regions 8 help to improve the cornering performance.

Preferably, the radius Rsi of curvature of the shoulder axial inner portion 21 is set to be not less than 50 mm, more preferably not less than 80 mm, still more preferably not less than 100 mm, but not more than 200 mm, more preferably not more than 160 mm, still more preferably not more than 140 mm. Preferably, the radius Rsi of curvature of the shoulder axial inner portion 21 is set in a range from 20% to 35%, more preferably 25% to 30% of the radius Rmo of curvature of the middle axial outer portion 17 and in a range from 20% to 35%, more preferably 25% to 30% of the radius Rsc of curvature of the shoulder axial central portion 20.

As a result, in cooperation with the crown land region 7 and middle land regions 9 configured as described above, the ground contacting pressure of the shoulder axial inner portion 21 is optimized for reducing the slip of the shoulder axial inner portion 21, and the resistance to uneven wear is further improved.

In order to ensure the above effects, it is preferred that all of the following relationships (5) to (8) are satisfied:

$$Rmi/Rsi > Rmi/Rcc \tag{5}$$

$$Rmi/Rsi > Rcc/Rmi \tag{6}$$

$$Rmi/Rsi > Rmo/Rsc \tag{7}$$

$$Rmi/Rsi > Rsc/Rmo \tag{8}$$

It is preferable that the axially outer side surface 8w of each of the shoulder land regions 8 which extends radially inwardly from the tread edge Te is curved concavely toward the axially inside.

The minimum radius Rsw of curvature of the side surface 8w is smaller than the radius Rsi of curvature of the shoulder axial inner portion 21. Specifically, the radius Rsw of curvature is 10 to 100 mm, preferably 10 to 50 mm, and more preferably 20 to 40 mm.

Such shoulder land region 8 is likely to fall moderately toward the axially outside to mitigate the load acting on the shoulder axial inner portion 21, and the resistance to uneven wear is improved.

It is preferable that the distance L1 in the tire axial direction from an intersection P1 (shown in FIG. 1) to the tire equatorial plane C is not more than the sum of the maximum depth d1 of the shoulder circumferential groove 6 and the distance L2 in the tire axial direction from the tire equatorial plane C to the tread edge Te. The intersection P1 is that of a virtual line 6v with the side surface of the tire. The virtual line 6v is drawn passing through the groove bottom of the shoulder circumferential groove 6 in parallel with the profile (arc line) of the shoulder axial central portion 20 and an extension line therefrom.

As a result, the shoulder land region 8 can moderately deformed by a reaction force from the road surface to reduce the load acting on the shoulder axial inner portion 21, so uneven wear of the shoulder land region 8 is further suppressed.

Preferably, the distance L1 is set in a range from 0.70 to 1.10 times, more preferably 0.80 to 1.00 times, still more preferably 0.85 to 0.95 times the sum of the distance L2 and the maximum depth d1.

Preferably, the area s2 of the ground contacting top surfaces of the shoulder land regions 8 is larger than the area s1 of the ground contacting top surfaces of the middle land regions 9. Specifically, the area s2 is in a range from 105% to 115% of the area S1. As a result, the resistance to uneven wear of the shoulder land region 8 is further improved.

Figure 3:
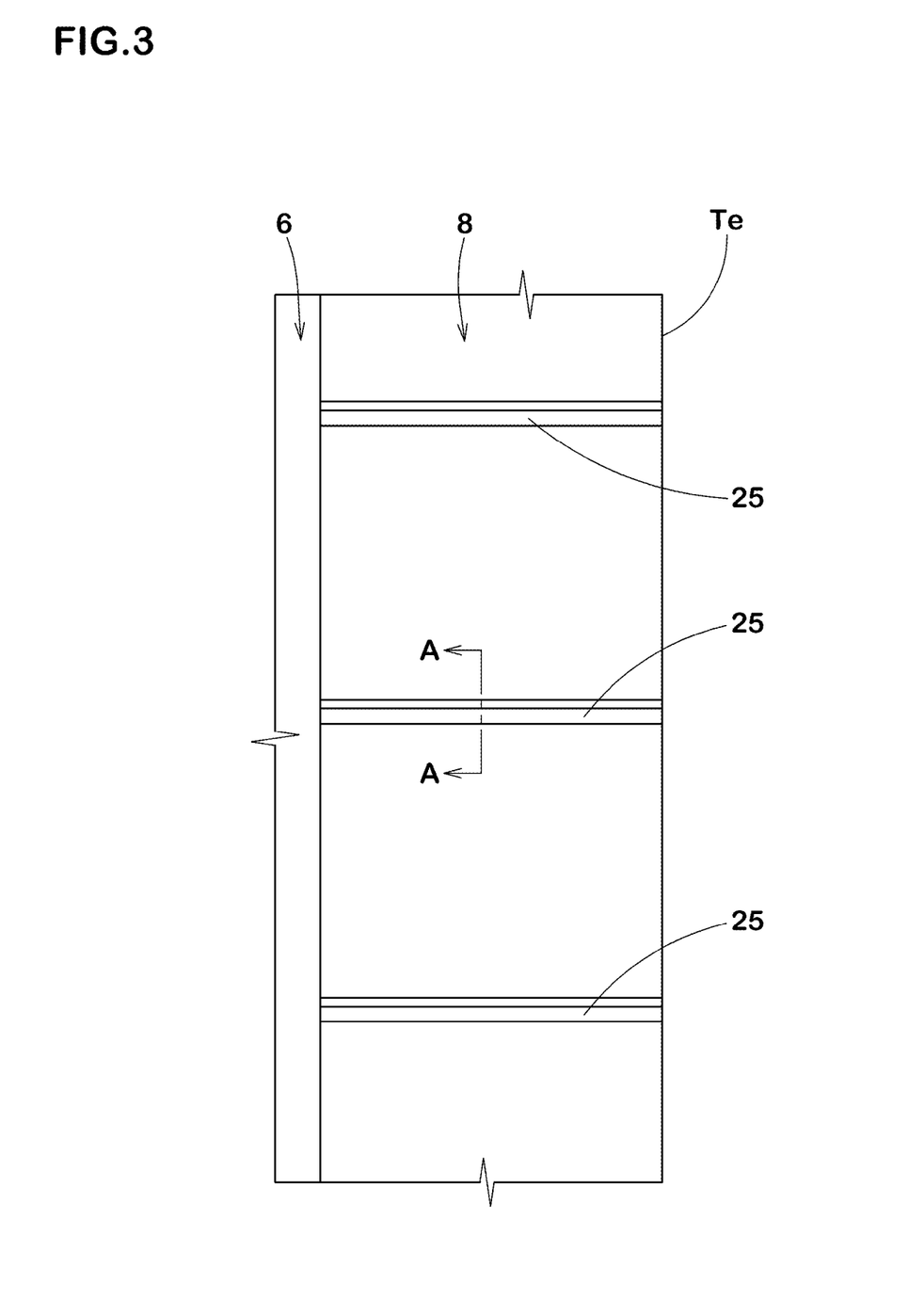
FIG. 3 is a partial top view of a shoulder land region provided with shoulder sipes.

FIG. 3 shows a part of the ground contacting top surface of the shoulder land region 8 in this embodiment.

The shoulder land regions 8 are each provided with only shoulder sipes 25 as shown. The present invention is however, not limited to such shoulder land region 8.

The term "sipe" means a narrow groove having a width not more than 1.5 mm inclusive of a cut having no substantial width. It is preferable for such a sipe to have a width in a range from 0.2 to 1.2 mm, more preferably 0.5 to 1.0 mm.

In the sipes provided in the present embodiment, the width of each sipe is within the above range over the entire depth.

In this application, when a groove has, in its depth direction, a portion having a width of not more than 1.5 mm and a portion having a width of more than 1.5 mm,
if such a portion having a width of not more than 1.5 mm is more than 50% of the total depth, then the groove is treated as a sipe with a groove portion.
If such a portion having a width of more than 1.5 mm is more than 50% of the total depth, then the groove is treated as a groove with a sipe portion.

The shoulder sipes 25 are connected to the adjacent shoulder circumferential grooves 6, and preferably extend to the adjacent tread edges Te across the entire width of the respective shoulder land regions 8.

Such shoulder sipes 25 suppress deformation of the ground contacting top surface of the shoulder land region 8 to improve the resistance to uneven wear.

In the present embodiment, the tire 1 has an intended rotational direction R.

Figure 4:
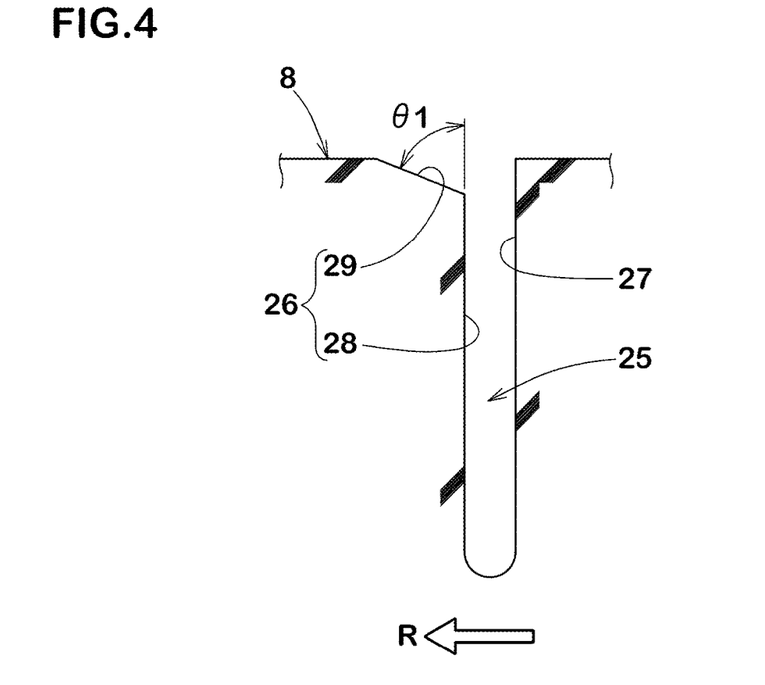
FIG. 4 is a cross-sectional view of the shoulder sipe taken along line A-A of FIG. 3.

As shown in FIG. 4 which shows a cross-sectional shape of the shoulder sipe 25 taken along line A-A of FIG. 3, the shoulder sipe 25 has two opposing sipe walls: a first sipe wall 26 to be positioned on the heel side of the tire rotation direction R, and accordingly, a second sipe wall 27 to be positioned on the toe side of the tire rotation direction R.

The first sipe wall 26 comprises a main portion 28 extending parallel to the tire radial direction, and an inclined portion 29 between the main portion 28 and the ground contacting top surface of the shoulder land region 8.

The inclined portion 29 has a larger angle with respect to the tire radial direction than the main portion 28.

The second sipe wall 27 is however, not provided with such inclined portion, and the angle with respect to the tire radial direction of the second sipe wall 27 is substantially the same as the main portion 28.

As a result, the traction performance is improved, and at the same time, the ground contacting property of the shoulder land region 8 is improved to improve the resistance to uneven wear.

In order to ensure the above effect, the angle $\theta 1$ of the inclined portion 29 with respect to the tire radial direction is not less than 45 degrees, preferably in a range from 50 to 80 degrees, more preferably 60 to 75 degrees.

Figure 5:
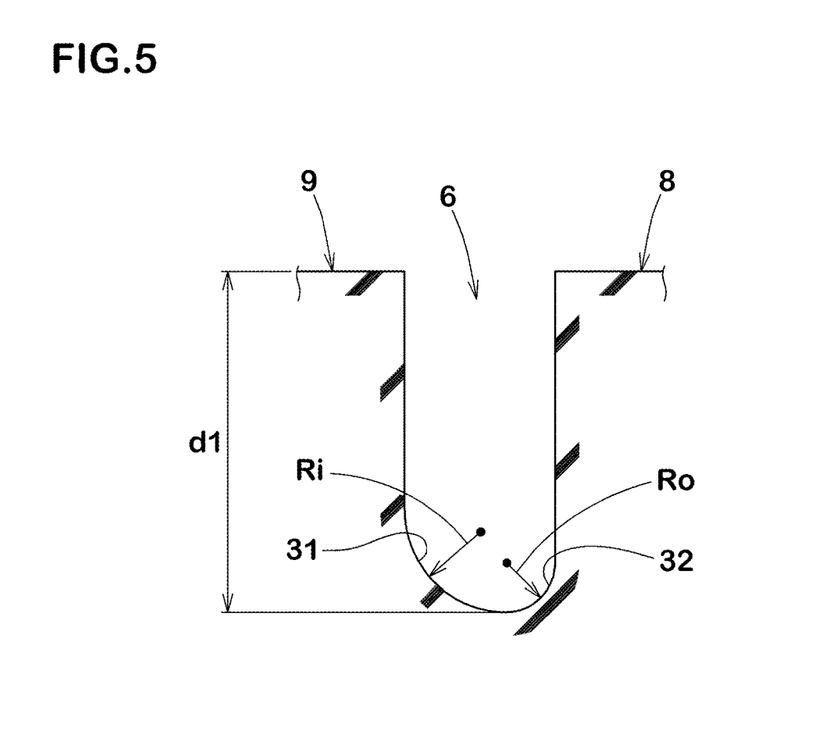
FIG. 5 is a cross-sectional view of the shoulder circumferential groove.

FIG. 5 shows a cross-sectional shape of another example of the shoulder circumferential groove 6.

As shown, the groove bottom of the shoulder circumferential groove 6 is asymmetrical with respect to the groove center line of the shoulder circumferential groove 6, and the groove bottom is made up of an axially inner portion 31 and an axially outer portion 32, which are positioned axially inside and outside the groove center line, respectively, and which have different curvatures.

As shown in FIG. 5, in the cross-section of the shoulder circumferential groove 6 perpendicular to the longitudinal direction thereof, the radius Ri of curvature of the axially inner portion 31 is larger than the radius Ro of curvature of the axially outer portion 32.

Preferably, the radius Ri is not more than 2.5 times, more preferably not more than 2.0 times, but preferably 1.5 times the radius Ro.

As a result, the load acting on the shoulder axial inner portion 21 of the shoulder land region 8 is reduced, and the resistance to uneven wear is improved.

while detailed description has been made of a preferable embodiment of the present invention, the present invention can be embodied in various forms without being limited to the illustrated embodiment.

Comparison Tests

Heavy-duty pneumatic tires of size 295/75R22.5 were experimentally manufactured as test tires.

The test tires had an identical tread pattern of five ribs (land regions) divided by four circumferential grooves as shown in FIG. 1. But, as shown in Tables 1 and 2, the radii Rcc, Rmi, Rmo, Rsc and Rsi of curvatures of various portions of the land regions were changed, otherwise all the test tires had the same structure.

The test tires were tested for the resistance to uneven wear of the shoulder land regions, and the resistance to uneven wear of the crown land region.

<Uneven Wear Resistance of Shoulder Land Regions and Uneven Wear Resistance of Crown Land Region>

The test tires mounted on wheel rims of size 22.5×8.25 and inflated to a 720 kPa were installed on all wheels of a 10 ton truck. Then, after traveling for a predetermined distance, the amount of wear in the shoulder axial inner portions and the amount of wear in the first crown axial outer portion were measured.

The results are indicated in Tables 1 and 2 by an index based on comparative example being 100, wherein the larger the value, the better the resistance to uneven wear.

As shown in Tables 1 and 2, it was confirmed that, in the tires according to the present invention, the uneven wear of the shoulder land region and the crown land region were suppressed.

TABLE 1

| tire | comparative example | working example 1 | working example 2 | working example 3 | working example 4 | working example 5 | working example 6 | working example 7 | working example 8 | working example 9 |
|---|---|---|---|---|---|---|---|---|---|---|
| crown axial central portion's curvature radius Rcc(mm) | 1500 | 1800 | 1800 | 1800 | 1800 | 1800 | 1600 | 2000 | 1800 | 1800 |
| middle axial inner portion's curvature radius Rmi(mm) | 1500 | 1800 | 1800 | 1800 | 1800 | 1800 | 1600 | 2000 | 1800 | 1800 |
| middle axial outer portion's curvature radius Rmo(mm) | 300 | 450 | 450 | 450 | 450 | 450 | 450 | 450 | 400 | 500 |
| shoulder axial central portion's curvature radius Rsc(mm) | 300 | 450 | 450 | 450 | 450 | 450 | 450 | 450 | 400 | 500 |
| shoulder axial inner portion's curvature radius Rsi(mm) | 300 | 120 | 80 | 90 | 140 | 160 | 120 | 120 | 120 | 120 |
| shoulder land region's uneven wear resistance | 100 | 168 | 173 | 170 | 160 | 152 | 174 | 167 | 166 | 171 |
| crown land region's uneven wear resistance | 100 | 117 | 107 | 112 | 117 | 121 | 108 | 124 | 114 | 117 |

TABLE 2

| tire | working example 10 | working example 11 | working example 12 | working example 13 | working example 14 | working example 15 | working example 16 | working example 17 |
|---|---|---|---|---|---|---|---|---|
| crown axial central portion's curvature radius Rcc(mm) | 1800 | 1800 | 1800 | 1800 | 1800 | 1800 | 1800 | 1800 |
| middle axial inner portion's curvature rads Rmi(mm) | 1440 | 1620 | 1980 | 2160 | 1800 | 1800 | 1800 | 1800 |
| middle axial outer portion's curvature radius Rmo(mm) | 450 | 450 | 450 | 450 | 450 | 450 | 450 | 450 |
| shoulder axial central portion's curvature radius Rsc(mm) | 450 | 450 | 450 | 450 | 360 | 405 | 495 | 540 |
| shoulder axial inner portion's curvature radius Rsi(mm) | 120 | 120 | 120 | 120 | 120 | 120 | 120 | 120 |
| shoulder land region's uneven wear resistance | 174 | 171 | 160 | 151 | 171 | 168 | 162 | 153 |
| crown land region's uneven wear resistance | 114 | 115 | 112 | 108 | 115 | 117 | 118 | 120 |

Further, test tires were experimentally manufactured by changing only the relationship of the distances L1 and L2 and depth d1 as shown in Table 3, and tested for uneven wear resistance as explained above. The test results are shown in Table 3.

TABLE 3

| tire | working example 1 | working example 18 | working example 19 | working example 20 | working example 21 | working example 22 | working example 23 |
|---|---|---|---|---|---|---|---|
| L1/(L2 + d1) | 0.87 | 0.75 | 0.80 | 0.85 | 0.90 | 1.00 | 1.05 |
| shoulder land region's uneven wear resistance | 168 | 151 | 157 | 164 | 166 | 161 | 141 |
| crown land region's uneven wear resistance | 117 | 115 | 117 | 117 | 116 | 115 | 113 |

From the test results, it was confirmed that the relationship of the distances L1 and L2 and depth d1 affects the resistance to uneven wear of the shoulder land region and the crown land region.

Further, test tires were experimentally manufactured by changing only the ratio of the area s1 of the ground contacting top surface of the middle land regions and the area s2 of the ground contacting top surface of the shoulder land regions, and tested for uneven wear resistance as explained above. The test results are shown in Table 4.

TABLE 4

| tire | working example 1 | working example 24 | working example 25 | working example 26 | working example 27 | working example 28 | working example 29 |
|---|---|---|---|---|---|---|---|
| area S2/area S1 | 1.10 | 1.00 | 1.05 | 1.08 | 1.12 | 1.15 | 1.20 |
| shoulder land region's uneven wear resistance | 168 | 148 | 160 | 166 | 167 | 162 | 154 |
| crown land region's uneven wear resistance | 117 | 114 | 116 | 117 | 117 | 119 | 121 |

From the test results, it was confirmed that the ratio of the area s2 to the area s1 affects the resistance to uneven wear of the shoulder land region and the crown land region.

Further, test tires were experimentally manufactured by changing only the angle of the inclined portion of the first sipe wall of each shoulder sipe, and tested for uneven wear resistance as explained above. The test results are shown in Table 5.

TABLE 5

| tire | working example 1 | working example 30 | working example 31 | working example 32 | working example 33 | working example 34 | working example 35 | working example 36 |
|---|---|---|---|---|---|---|---|---|
| shoulder sipe | absent | present | present | present | present | present | present | present |
| shoulder sipe inclined portion angle $\theta1$ (deg.) | — | 55 | 60 | 65 | 68 | 70 | 75 | 80 |
| shoulder land region's uneven wear resistance | 168 | 158 | 164 | 172 | 175 | 174 | 171 | 168 |
| crown land region's uneven wear resistance | 117 | 112 | 113 | 113 | 114 | 114 | 115 | 116 |

From the test results, it was confirmed that the angle of the inclined portion of the first sipe wall affects the resistance to uneven wear of the shoulder land region and the crown land region.

Further, test tires were experimentally manufactured by changing the shoulder circumferential grooves shown in FIG. 1 to that of the asymmetrical cross-sectional shape shown in FIG. 5, and changing only the radii of curvature of the inner portion and the outer portion. Then, the tires were tested for uneven wear resistance as explained above. The test results are shown in Table 6.

TABLE 6

| tire | working example 1 | working example 37 | working example 38 | working example 39 | working example 40 | working example 41 | working example 42 | working example 43 |
|---|---|---|---|---|---|---|---|---|
| shoulder circumferential groove | FIG. 1 | FIG. 5 | FIG. 5 | FIG. 5 | FIG. 5 | FIG. 5 | FIG. 5 | FIG. 5 |
| Ri/Ro | 1.0 | 1.3 | 1.5 | 1.8 | 2.0 | 2.2 | 2.5 | 2.8 |
| shoulder land region's uneven wear resistance | 168 | 173 | 176 | 178 | 181 | 173 | 168 | 159 |
| crown land region's uneven wear resistance | 117 | 117 | 116 | 115 | 115 | 114 | 114 | 113 |

From the test results, it was confirmed that the radii of curvature of the inner and outer portions of the shoulder circumferential groove affect the resistance to uneven wear of the shoulder land region and the crown land region.

DESCRIPTION OF THE REFERENCE SIGNS 2 tread portion
3 circumferential groove
4 land region
7 crown land region
8 shoulder land region
9 middle land region
10 crown axial central portion
16 middle axial inner portion
17 middle axial outer portion
21 shoulder axial inner portion
20 shoulder axial central portion
Rcc radius of curvature of crown axial central portion
Rmi radius of curvature of middle axial inner portion
Rmo radius of curvature of middle axial outer portion
Rsi radius of curvature of shoulder axial inner portion
Rsc radius of curvature of shoulder axial central portion

The invention claimed is:

1. A tire comprising:
a tread portion provided with a plurality of circumferential grooves extending continuously in the tire circumferential direction, and a plurality of land regions divided by the plurality of circumferential grooves,
the plurality of land regions including a crown land region on a tire equator, shoulder land regions extending axially inwardly from respective tread edges, and middle land regions between the respective shoulder land regions and the crown land region,
the ground contacting top surface of the crown land region comprising a crown axial central portion defined as including a center position in a tire axial direction of the crown land region,
the ground contacting top surface of each of the middle land regions comprising a middle axial inner portion defined as extending from an axially inner edge of the ground contacting top surface, and a middle axial outer portion defined as extending from an axially outer edge of the ground contacting top surface, and
the ground contacting top surface of each of the shoulder land regions comprising a shoulder axial inner portion defined as extending from an axially inner edge of the ground contacting top surface, and a shoulder axial central portion defined as including a center position in the tire axial direction of the shoulder land region,
wherein
in a meridian cross-section of the tire including a rotational axis of the tire,
a radius Rmi of curvature of the middle axial inner portion is substantially equal to a radius Rcc of curvature of the crown axial central portion,
a radius Rsc of curvature of the shoulder axial central portion is in a range from 0.90 to 1.10 times a radius Rmo of curvature of the middle axial outer portion,
the radius Rsc of curvature of the shoulder axial central portion and the radius Rmo of curvature of the middle axial outer portion are smaller than the radius Rcc of curvature of the crown axial central portion and the radius Rmi of curvature of the middle axial inner portion, and
a radius Rsi of curvature of the shoulder axial inner portion is smaller than the radius Rsc of curvature of the shoulder axial central portion and the radius Rmo of curvature of the middle axial outer portion,
wherein
each of the shoulder land regions has an axially outer side surface curved concavely toward an inside in the tire axial direction, and
a minimum radius Rsw of curvature of the axially outer side surface is smaller than the radius Rsi of curvature of the shoulder axial inner portion,
wherein
in the meridian cross-section of the tire including the rotational axis of the tire, the axially outer side surface comprises a radially outer portion extending linearly and radially inwardly from the tread edge, and an arc-shaped portion extending radially inwardly from the radially outer portion, the radially outer portion and the arc-shaped portion are connected with each other smoothly without forming an inflection point, and said minimum radius Rsw of curvature occurs in the arc-shaped portion,
the circumferential grooves include a shoulder circumferential groove disposed on each side of the tire equator to separate between the shoulder land region and the middle land region, and
the shoulder circumferential groove and the arc-shaped portion on a same side of the tire equator are disposed such that a virtual line parallel with an arc profile of the shoulder axial central portion passes through both a bottom of the shoulder circumferential groove and an outermost point of the arc-shaped portion in the tire axial direction,
wherein
the shoulder circumferential groove has a groove bottom comprising an axially inner portion axially inside a groove center line of the shoulder circumferential groove, and an axially outer portion axially outside the groove center line of the shoulder circumferential groove, and
in the meridian cross-section of the tire, the groove bottom is curved so that a radius of curvature of the axially inner portion is larger than a radius of curvature of the axially outer portion.

2. The tire according to claim 1, which is a heavy-duty pneumatic tire, wherein
the radius Rcc of curvature of the crown axial central portion is 1600 to 2000 mm, and
the radius Rmi of curvature of the middle axial inner portion is 1600 to 2000 mm.

3. The tire according to claim 2, which is a heavy-duty pneumatic tire, wherein
the radius Rsc of curvature of the shoulder axial central portion is 400 to 500 mm, and
the radius Rmo of curvature of the middle axial outer portion is 400 to 500 mm.

4. The tire according to claim 2, which is a heavy-duty pneumatic tire, wherein the radius Rsi of curvature of the shoulder axial inner portion is 80 to 160 mm.

5. The tire according to claim 3, which is a heavy-duty pneumatic tire, wherein the radius Rsi of curvature of the shoulder axial inner portion is 80 to 160 mm.

6. The tire according to claim 1, wherein
in the meridian cross-section of the tire, the virtual line intersects with a side surface of the tire at a position P1 thereon which is separated from a tire equatorial plane by a distance L1 in the tire axial direction, and the distance L1 is not more than the sum of a maximum depth d1 of the shoulder circumferential groove and a distance L2 in the tire axial direction between the tire equatorial plane and the tread edge.

7. The tire according to claim 4, wherein the distance L1 is 0.80 to 1.00 times the sum of the distance L2 and the maximum depth d1.

8. The tire according to claim 1, wherein the area of the ground contacting top surfaces of the shoulder land regions is larger than the area of the ground contacting top surfaces of the middle land regions.

9. The tire according to claim 1, wherein the area of the ground contacting top surfaces of the shoulder land regions is in a range from 105% to 115% of the area of the ground contacting top surfaces of the middle land regions.

10. The tire according to claim 1, wherein the shoulder land regions are provided with shoulder sipes each connected to one of the circumferential grooves.

11. The tire according to claim 10, wherein
the shoulder sipes each have a first sipe wall comprising a main portion, and an inclined portion extending between the main portion and the ground contacting top surface of the shoulder land region, and
the inclined portion is inclined at an angle with respect to the tire radial direction which is larger than that of the main portion.

12. The tire according to claim 11, which has an intended rotational direction, wherein the shoulder sipes each have two opposite sipe walls, only one of which to be located on the heel side in the tire rotation direction, is formed as said first sipe wall.

13. The tire according to claim 11, wherein the angle of the inclined portion with respect to the tire radial direction is in a range from 60 to 75 degrees.

14. The tire according to claim 1, wherein the radius of curvature of the axially inner portion of the shoulder circumferential groove is not more than 2.0 times the radius of curvature of the axially outer portion of the shoulder circumferential groove.

15. The tire according to claim 1, which is a heavy-duty pneumatic tire, wherein
in the meridian cross-section of the tire including the rotational axis of the tire, the axially outer side surface and the ground contacting top surface of each shoulder land region intersect with each other to form an angled tire shoulder, whereby the heavy-duty pneumatic tire has a pair of the angled tire shoulders.

16. The tire according to claim 3, wherein
in the meridian cross-section of the tire including the rotational axis of the tire, the axially outer side surface and the ground contacting top surface of each shoulder land region intersect with each other to form an angled tire shoulder, whereby the heavy-duty pneumatic tire has a pair of the angled tire shoulders.

17. The tire according to claim 6, wherein
said arc-shaped portion extends radially inwardly to the position P1.

18. A tire comprising:
a tread portion provided with a plurality of circumferential grooves extending continuously in the tire circumferential direction, and a plurality of land regions divided by the plurality of circumferential grooves,
the plurality of land regions including a crown land region on a tire equator, shoulder land regions extending axially inwardly from respective tread edges, and middle land regions between the respective shoulder land regions and the crown land region,
the ground contacting top surface of the crown land region comprising a crown axial central portion defined as including a center position in a tire axial direction of the crown land region,
the ground contacting top surface of each of the middle land regions comprising a middle axial inner portion defined as extending from an axially inner edge of the ground contacting top surface, and a middle axial outer portion defined as extending from an axially outer edge of the ground contacting top surface, and
the ground contacting top surface of each of the shoulder land regions comprising a shoulder axial inner portion defined as extending from an axially inner edge of the ground contacting top surface, and a shoulder axial central portion defined as including a center position in the tire axial direction of the shoulder land region,
wherein
in a meridian cross-section of the tire including a rotational axis of the tire,
a radius Rmi of curvature of the middle axial inner portion is substantially equal to a radius Rcc of curvature of the crown axial central portion,
a radius Rsc of curvature of the shoulder axial central portion is in a range from 0.90 to 1.10 times a radius Rmo of curvature of the middle axial outer portion,
the radius Rsc of curvature of the shoulder axial central portion and the radius Rmo of curvature of the middle axial outer portion are smaller than the radius Rcc of curvature of the crown axial central portion and the radius Rmi of curvature of the middle axial inner portion,
a radius Rsi of curvature of the shoulder axial inner portion is smaller than the radius Rsc of curvature of the shoulder axial central portion and the radius Rmo of curvature of the middle axial outer portion,
each of the shoulder land regions includes an axially outer side surface that comprises a radially outer portion extending linearly and radially inwardly from one of the respective tread edges, and an arc-shaped portion extending radially inwardly from the radially outer portion and curved concavely toward an axially inside, and
the radially outer portion and the arc-shaped portion are connected with each other smoothly without forming an inflection point,
wherein
the circumferential grooves include a shoulder circumferential groove disposed on each side of the tire equator to separate between the shoulder land region and the middle land region,
the shoulder circumferential groove has a groove bottom comprising an axially inner portion axially inside a groove center line of the shoulder circumferential groove, and an axially outer portion axially outside the groove center line of the shoulder circumferential groove, and
in the meridian cross-section of the tire, the groove bottom is curved so that a radius of curvature of the axially inner portion is larger than a radius of curvature of the axially outer portion, and
the shoulder circumferential groove and the arc-shaped portion on a same side of the tire equator are disposed such that a virtual line parallel with an arc profile of the shoulder axial central portion passes through both a bottom of the shoulder circumferential groove and an outermost point of the arc-shaped portion in the tire axial direction.

19. A tire comprising:

a tread portion provided with a plurality of circumferential grooves extending continuously in the tire circumferential direction, and a plurality of land regions divided by the plurality of circumferential grooves, the plurality of land regions including a crown land region on a tire equator, shoulder land regions extending axially inwardly from respective tread edges, and middle land regions between the respective shoulder land regions and the crown land region, the ground contacting top surface of the crown land region comprising a crown axial central portion defined as including a center position in a tire axial direction of the crown land region, the ground contacting top surface of each of the middle land regions comprising a middle axial inner portion defined as extending from an axially inner edge of the ground contacting top surface, and a middle axial outer portion defined as extending from an axially outer edge of the ground contacting top surface, and the ground contacting top surface of each of the shoulder land regions comprising a shoulder axial inner portion defined as extending from an axially inner edge of the ground contacting top surface, and a shoulder axial central portion defined as including a center position in the tire axial direction of the shoulder land region, wherein in a meridian cross-section of the tire including a rotational axis of the tire, a radius Rmi of curvature of the middle axial inner portion is substantially equal to a radius Rcc of curvature of the crown axial central portion, a radius Rsc of curvature of the shoulder axial central portion is substantially equal to a radius Rmo of curvature of the middle axial outer portion, the radius Rsc of curvature of the shoulder axial central portion and the radius Rmo of curvature of the middle axial outer portion are smaller than the radius Rcc of curvature of the crown axial central portion and the radius Rmi of curvature of the middle axial inner portion, and a radius Rsi of curvature of the shoulder axial inner portion is smaller than the radius Rsc of curvature of the shoulder axial central portion and the radius Rmo of curvature of the middle axial outer portion, wherein each of the shoulder land regions includes an axially outer side surface that comprises a radially outer portion extending linearly and radially inwardly from one of the respective tread edges, and an arc-shaped portion extending radially inwardly from the radially outer portion and curved concavely toward an axially inside, and the radially outer portion and the arc-shaped portion are connected with each other smoothly without forming an inflection point, a minimum radius Rsw of curvature of the axially outer side surface is smaller than the radius Rsi of curvature of the shoulder axial inner portion, wherein the circumferential grooves include a shoulder circumferential groove disposed on each side of the tire equator to separate between the shoulder land region and the middle land region, the shoulder circumferential groove has a groove bottom comprising an axially inner portion axially inside a groove center line of the shoulder circumferential groove, and an axially outer portion axially outside the groove center line of the shoulder circumferential groove, and in the meridian cross-section of the tire, the groove bottom is curved so that a radius of curvature of the axially inner portion is larger than a radius of curvature of the axially outer portion, and the shoulder circumferential groove and the arc-shaped portion on a same side of the tire equator are disposed such that a virtual line parallel with an arc profile of the shoulder axial central portion passes through both a bottom of the shoulder circumferential groove and an outermost point of the arc-shaped portion in the tire axial direction.

* * * * *